United States Patent [19]

Castellucci et al.

[11] 4,322,459

[45] Mar. 30, 1982

[54] EPOXY DERIVED RESINS CONTAINING AMINO OR MERCAPTO SUBSTITUTED AZOLE FUNCTIONALITY AND COMPOSITIONS CONTAINING SAME

[75] Inventors: Nicholas T. Castellucci; John S. Ostrowski, both of Pittsburgh; John F. Grunewalder, Glenshaw, all of Pa.

[73] Assignee: PPG Industries, Inc., Pittsburgh, Pa.

[21] Appl. No.: 208,973

[22] Filed: Nov. 21, 1980

[51] Int. Cl.$^3$ .............................................. C08G 59/50
[52] U.S. Cl. .................................. 428/386; 525/107; 525/117; 525/329; 525/336; 525/375; 525/481; 525/510; 525/513; 525/523; 528/117; 528/374; 528/377; 528/407
[58] Field of Search ............... 525/107, 117, 329, 336, 525/375, 523, 481, 510, 513; 528/117, 374, 377, 407; 427/386

[56] References Cited

U.S. PATENT DOCUMENTS 3,008,941 11/1961 Lynn .
3,383,433 3/1968 Salensky .
3,438,937 4/1969 Christie .
3,493,630 2/1970 Salensky .
3,700,636 10/1972 Haiss et al. ..................... 525/117 X
3,753,956 8/1973 Tuites et al. .

FOREIGN PATENT DOCUMENTS 51-93999 8/1976 Japan .

OTHER PUBLICATIONS

Kotone et al., "Epoxy Resin Compositions Containing 4-Aminotriazole Compounds", Chemical Abstracts 79, 32461y (1973).

*Primary Examiner*—Earl A. Nielsen
*Attorney, Agent, or Firm*—Thomas M. Breininger

[57] ABSTRACT

The invention is directed to resins which are the reaction product of an amino or mercapto substituted azole and a polyepoxide wherein the ratio of equivalents of the azole to the polyepoxide is from about 0.5:1.0 to about 1.5:1.0, preferably from about 0.9:1.0 to about 1.1:1.0. The resins can be acid or base solulized depending on whether amino or mercapto substituted azoles were used in their preparation. The invention is also directed to storage stable compositions which cure at relatively low temperatures in short periods of time comprising specified amounts of the resin containing azole-functionality, polyepoxides, organic solvents, and optionally pigments and additives.

31 Claims, No Drawings

EPOXY DERIVED RESINS CONTAINING AMINO OR MERCAPTO SUBSTITUTED AZOLE FUNCTIONALITY AND COMPOSITIONS CONTAINING SAME

BACKGROUND OF THE INVENTION

Recently there has developed a need for coating compositions which are both storage stable and curable at relatively low temperatures in short periods of time. Substrates coated with such compositions may be processed in a more energetically efficient manner in shorter processing times.

U.S. Pat. No. 3,383,937 discloses the use of imidazoles such as 2-ethyl-4-methyl imidazole, 2-hexyl-4-phenyl imidazole, benzimidazole and others as curing agents for polyepoxides. The compositions of U.S. Pat. No. 3,438,937 generally having curing times of several hours at temperatures of 40° to 300° C., preferably 50° to 250° C.

U.S. Pat. No. 3,383,433 discloses the use of a mixture of phenolic novolac resin and an azole as a curing agent for polyepoxide resins. The compositions of U.S. Pat. No. 3,383,433 generally cure at temperatures of about 125° C. to about 175° C. for two hours.

Japanese Kokai 51[1976]-93,999 discloses the use of 1,2,4-triazoles, substituted by certain groups such as —CONH$_2$, as curing agents for epoxy resins. These substituted triazoles are merely mixed at room temperature with the epoxy resins in epoxide curing amounts. The epoxy resins which contain these curing agents are hardened by heat treatment at 50°–200° C. in 1–20 hours.

An object of the present invention is to provide storage stable, azole-functional resins which can be used to prepare coating compositions. Other objects of the present invention are to provide storage stable coating compositions which can be cured at low temperatures in short time periods.

Accordingly, there have been found storage stable coating compositions prepared from new azole-functional resins which can be cured at low temperatures in short time periods to produce films that resist organic solvents, are relatively hard, and have a high degree of gloss.

SUMMARY OF THE INVENTION

The present invention is directed to resins comprising the reaction products of an amino or mercapto substituted azole with a polyepoxide and also to storage stable, low temperature curing compositions comprising the resins of the present invention, polyepoxides and organic solvents.

The resins of the invention comprise the ungelled reaction product of an amino or mercapto substituted azole and a polyepoxide wherein the ratio of equivalents of the azole to equivalents of the polyepoxide is from about 0.5:1.0 to about 1.5:1.0. The resins can be acid or base solubilized depending on whether they are prepared from amino or mercapto substituted azole. The compositions of the invention, which are storage stable and curable at relatively low temperatures, comprise specified amounts of the resins containing substituted azole functionality, polyepoxides, organic solvents, and optionally pigments and additives. The compositions may be applied to various substrates and cured at relatively low temperatures in relatively short time periods.

DETAILED DESCRIPTION OF THE INVENTION

The resins of the invention comprise the ungelled reaction product of (A) a N-heterocyclic compound selected from the group consisting of a triazole, a tetrazole and a mixture thereof, the N-heterocyclic compound substituted on at least one carbon atom in the N-heterocyclic ring by a group of the formula

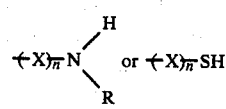

wherein
X represents an alkylene group containing from 1 to 6 carbon atoms optionally halogen substituted, a cycloalkylene group containing from 5 to 8 carbon atoms optionally halogen substituted, or a phenylene group optionally substituted by halogen and/or an alkyl group containing from 1 to 6 carbon atoms,
n represents 0 or 1, and
R represents hydrogen, an alkyl group containing from 1 to 6 carbon atoms optionally halogen substituted, or a cycloalkyl group containing from 5 to 8 carbon atoms optionally halogen substituted; and (B) a polyepoxide wherein the ratio of equivalents of the N-heterocyclic compound to the polyepoxide respectively is from about 0.5:1.0 to about 1.5:1.0, preferably from about 0.9:1.0 to about 1.1:1.0; and most preferably in a ratio of about 1.0:1.0.

Wherever used herein, the term polyepoxide refers to a compound or a mixture of compounds containing more than one epoxy group of the formula

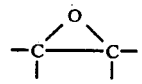

A number of polyepoxides are known, examples of which are described in the *Handbook of Epoxy Resins*, Henry Lee and Kris Neville, 1967, McGraw-Hill Book Company. The polyepoxides may be saturated or unsaturated, aliphatic, cycloaliphatic, aromatic or heterocyclic and may be substituted with substituents such as chlorine, hydroxyl groups, ether radicals and the like. The polyepoxides may be monomeric or polymeric.

Some preferred polyepoxides are the polyglycidyl ethers of polyphenols such as 2,2-bis (4-hydroxyphenyl) propane commonly known as bisphenol-A. These polyglycidyl ethers may be prepared, for example, by etherification of a polyphenol with epichlorohydrin or dichlorohydrin in the presence of an alkali. Examples of preferred polyphenols include: 1,1-bis (4-hydroxyphenyl) ethane; 2,2-bis (4-hydroxyphenyl) propane; 1,1-bis (4-hydroxyphenyl) isobutane; 2,2-bis (4-hydroxytertiarybutylphenyl) propane; bis (2-hydroxynaphthyl) methane; 1,5-dihydroxynaphthalene; 1,1-bis-(4-hydroxy-3-allylphenyl) ethane and the like.

The preferred polyglycidyl ethers of polyphenols also include the polymeric epoxy resins of various molecular weights which may be produced for example by varying the mole ratio of epichlorohydrin to polyphenol in known manner. The polyepoxides used in the invention generally have average molecular weights ranging from about 300 to about 8000, preferably from about 300 to about 2000 and epoxide equivalent weights ranging from about 150 to about 4000, preferably from about 150 to about 1000. Examples of such polymeric epoxy resins particularly include EPON 1001 (a polyglycidyl ether of bisphenol A having an average molecular weight of about 1000 and an epoxide equivalent weight of about 500), EPON 828 (a polyglycidyl ether of bisphenol A having an average molecular weight of about 380 and an epoxide equivalent weight of about 190), and EPON 812 (a polyglycidyl ether of bisphenol A having an average molecular weight of about 310 and an epoxide equivalent weight of about 160), all three polymeric epoxy resins available from the Shell Oil Company. As used herein an epoxide equivalent is the weight of polyepoxide in grams which contains 1 gram-equivalent of epoxy groups. For example, if a polymeric epoxide resin chain is assumed to be linear with no side branching and one epoxy group terminates each end, no other epoxy groups being present, the epoxide equivalent (weight) would be one half of the average molecular weight of the resin.

As used herein, an equivalent of N-heterocyclic groups represents one mole of N-heterocyclic moieties. An equivalent weight of N-heterocyclic group-containing compound is the weight of compound in grams which contains one mole of N-heterocyclic moieties.

Suitable polyepoxides also include the polyglycidyl ethers of mononuclear polyhydric phenols such as the polyglycidyl ethers of resorcinal, pyrogallol, hydroquinone, and pyrocatechol.

Processes for the preparation of polyglycidyl ethers of polyhydric phenols are known and are described, for example, in U.S. Pat. Nos. 2,506,486 and 2,943,095.

Also suitable are the generally known polyglycidyl ethers of polyhydric alcohols such as the reaction products of epichlorohydrin or dichlorohydrin with aliphatic or cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis (4-hydroxycyclohexyl) propane. Examples of methods for preparing polyglycidyl ethers of polyhydric alcohols are described in U.S. Pat. No. 2,898,349.

Also useful are the polyepoxides derived from the epoxidation of an olefinically unsaturated alicyclic compound. These polyepoxides are non-phenolic and may be obtained by epoxidation of alicyclic olefins, for example, by oxygen and selected metal catalysts, by perbenzoic acid, by acetaldehyde monoperacetate or by peracetic acid. Among such polyepoxides are the epoxy alicyclic ethers and esters generally known in the art.

Polyepoxides containing oxyalkylene groups may also be used in the invention. Such oxyalkylene groups are typically groups of the formula:

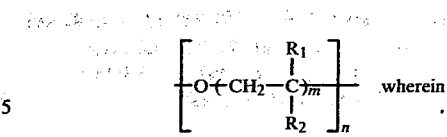

wherein $R_1$ and $R_2$ independently represent hydrogen or an alkyl group, preferably a lower alkyl group (such as one having from 1 to 6 carbon atoms) and wherein m is from 1 to 4 and n is from 2 to 50. The oxyalkylene groups may be part of the main polyepoxide chain itself or pendant to the main polyepoxide chain. Polyepoxides containing oxyalkylene groups are generally known and may be prepared for example by reacting some of the epoxy groups of a polyepoxide such as the epoxy resins mentioned above with an alcohol containing oxyalkylene groups.

The polyglycidyl esters of polycarboxylic acids such as polyglycidyl esters of adipic acid, phthalic acid and the like may also be used as starting materials in the invention. Polyglycidyl esters of polycarboxylic acids are described for example in U.S. Pat. No. 2,870,170.

In addition to the polyepoxide resins described above, addition polymerized polymers containing epoxy groups may also be used in the invention. These polyepoxides may be produced by the copolymerization of a wide variety of generally known polymerizable vinyl monomers including, for example, glycidyl acrylate, glycidyl methacrylate and allyl glcyidyl ether. These epoxy functional monomers may be copolymerized with any monomers containing at least one $CH_2\!\!=\!\!C\!<$ group, preferably in terminal position, and which do not contain a group reactive with the epoxy group under the conditions for addition polymerization. Suitable comonomers include for example: polymerizable monoolefinic compounds such as styrene, alpha-methyl styrene, alpha-ethyl styrene, vinyl toluene, t-butyl styrene and allyl alcohol: halogenated mono-olefinic hydrocarbons such as alphachlorostyrene, alpha-bromostyrene, 2,5-dichlorostyrene, 2,5-dibromostyrene, 3,4-difluorostyrene, ortho-, meta-, and para-fluorostyrenes, 2,6-difluorostyrene, 3-fluoro-4-chlorostyrene, 2,4,6-trichlorostyrene and dichloromonofluorostyrenes; unsaturated carboxylic acid amides such as acrylamide and methacrylamide; unsaturated nitriles such as acrylonitrile, methacrylonitrile, ethacrylonitrile, 3-octenenitrile; and esters of methacrylic acids such as ethyl methacrylate, isopropyl methacrylate, isobutyl methacrylate and isobornyl methacrylate.

Preferred addition polymerized polymers containing epoxy groups are acrylic polymers containing pendant or terminal epoxy groups which may be prepared, for example, by the addition polymerization of compounds or mixtures of compounds such as glycidyl acrylate, glycidyl methacrylate and allyl glycidyl ether.

Additionally, the reaction products of the polymeric polyepoxides and the N-heterocyclic materials containing at least two groups reactive with epoxy moieties, usually hydrogen atoms, and containing

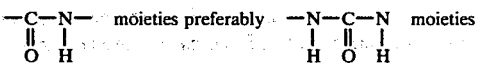

as described in U.S. Pat. No. 4,110,287 may also be used in the present invention. So much of the disclosures of U.S. Pat. No. 4,110,287 as pertains to these polyepoxides is hereby incorporated by reference.

The resins of the present invention comprise the ungelled reaction product of a polyepoxide with the aforementioned N-heterocyclic compound or mixture of N-heterocyclic compounds from the group consisting of a triazole and a tetrazole. The N-heterocyclic compound is substituted by at least one primary or secondary amino group, or at least one mercapto group.

3-mercapto-1,2,4-triazole is suggested as just one typical reaction occurring during the production of a resin of the invention.

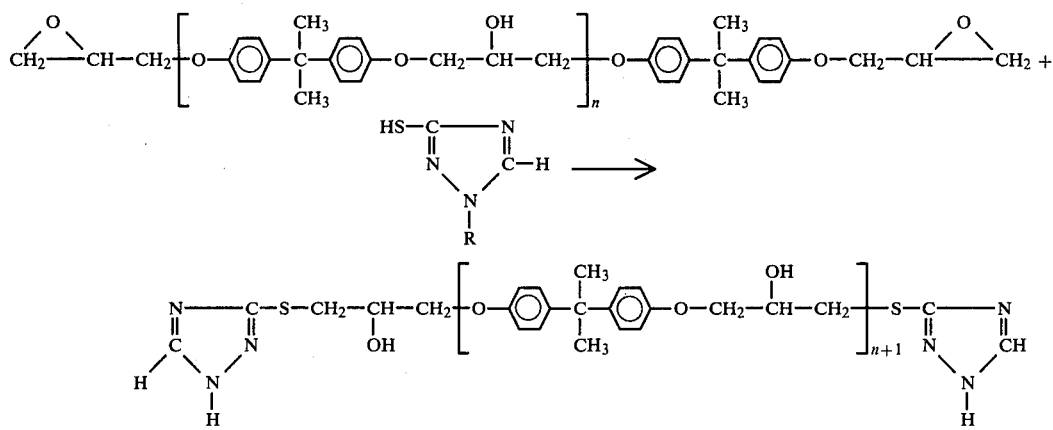

Examples of tetrazoles which may be reacted with the polyepoxides to form the resins of the invention include 5-mercaptotetrazole, 5-aminotetrazole, 5-methylaminotetrazole, 5-ethylaminotetrazole, and mixtures thereof.

A preferred class of azoles are the triazoles containing the previously described substituents. The triazoles may be substituted, for example, by optionally halogen substituted lower alkyl groups having from 1 to 6 carbon atoms and optionally halogen substituted cycloalkyl groups containing from 5 to 8 carbon atoms. Examples of suitable, amino-substituted triazoles include 3-amino-1,2,4-triazole, 5-amino-1,2,4-triazole, 4-amino-1,2,3-triazole, 5-amino-1,2,3-triazole or mixtures thereof. Examples of suitable mercapto substituted triazoles suitable for the invention include 3-mercapto-1,2,4-triazole, 5-mercapto-1,2,4-triazole, 4-mercapto-1,2,3-triazole, 5-mercapto-1,2,3-triazole or mixtures thereof. The mercapto substituted triazoles are particularly preferred, especially when the polyepoxide component for the resin of the invention is an acrylic component containing pendant or terminal epoxy groups. The reaction of the mercapto substituted triazoles with epoxy functional acrylic polymers appears to be more complete than the reaction or primary amino substituted triazoles with epoxy functional acrylic polymers on the basis of longer pot lives for the mercapto substituted triazole/epoxy functional acrylic resins.

The reaction of the mercapto or amino substituted azole with the polyepoxide to form the resin is believed to proceed primarily by a polyepoxide chain lengthening mechanism. The amino or mercapto group which is outside the N-heterocyclic ring is substantially more reactive than the >NH group within the ring. Thus, in the equivalent ratio range of azole to polyepoxide to form the resins of the invention, the reaction is believed to proceed substantially stoichiometrically via the amino or mercapto groups external to the N-heterocyclic ring. Although not intending to be bound by any particular mechanism of reaction, the following reaction between a polyglycidyl ether of bisphenol-A and wherein n generally ranges from about 0 to about 25. However, other reactions may be possible during the formation of the resins of the invention.

The resins of the invention are produced by the reaction of the N-heterocyclic compound and the polyepoxide in an equivalent ratio of from about 0.5:1.0 to about 1.5:1.0 respectively, preferably from about 0.9:1.0 to about 1.1:1.0, and most preferably at an equivalent ratio of 1.0:1.0. The temperature of the reaction may vary but generally ranges from about 90° C. to about 140° C. An organic solvent generally is included in the reaction mixture to facilitate control of the reaction. Many suitable organic solvents or mixtures of solvents may be used. Examples of suitable solvents include: the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether, and the mono-and dialkyl ethers of diethylene glycol such as diethylene glycol monoethyl ether, diethylene glycol dibutyl ether, diethylene glycol diethyl ether and diethylene glycol monobutyl ether acetate.

In preparing a resin of the invention, if a substantial excess of equivalents of polyepoxide over equivalents of N-heterocyclic compound is used (e.g., 1.00 equivalent polyepoxide to 0.5 equivalent N-heterocyclic compound,) the reaction may be stopped by any appropriate means such as cooling the reaction mixture before it gels. In such manner, a mixture of a resin of the invention and unreacted polyepoxide may be prepared in situ which is storage stable and suitable for use in preparing curable coating compositions of the invention described infra.

The resins of the invention are substantially clear, slightly colored liquids which have pot lives at room temperature of at least 6 months, typically at least 12 months.

The resins produced from the polyepoxide and mercapto substituted azoles may be partially or completely neutralized by bases to produce water soluble materials. A wide variety of organic and inorganic bases may be used to water solubilize these resins examples of which include ammonium hydroxide, sodium hydroxide, potassium hydroxide, amines such as dimethylethanolamine and triethanolamine, and mixtures thereof. The base neutralization may be carried out either by slowly adding the base to the resin or slowly adding the resin to the base. The resins producedd from the reaction of acrylic components containing epoxy groups with mercapto substituted azoles thus provide a distinct advantage over generally known water soluble acrylic resins in that these resins of the invention do not require the presence of carboxyl groups to effect water solubilization.

The resins of the invention produced from amino substituted azoles and polyepoxides may be partially or completely neutralized by acids to produce water soluble materials. A wide variety of organic and inorganic acids may be used examples of which include: formic acid, lactic acid, acetic acid, phosphoric acid and mixtures thereof. The acid neutralization may be carried out either by addition of the acid to the resin or by addition of the resin to the acid. Thus resins produced from the reaction of acrylic components containing epoxy groups with amino substituted azoles also provide the distinct advantage over generally known water soluble acrylic resins in that the resins of the invention do not require the presence of carboxyl groups to effect water solubilization.

The resins of the invention are used in admixture with polyepoxides and organic solvents to produce the storage stable, coating compositions of the invention. The coating compositions of the invention comprise: (A) from about 15 percent to about 45 percent by weight of the reaction product of (i) a N-heterocyclic compound selected from the group consisting of a triazole, a tetrazole, and mixtures thereof, the N-heterocyclic compound substituted on at least one carbon atom in the heterocyclic ring by a group of the formula

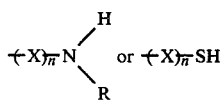

previously defined herein, and (ii) a polyepoxide, wherein the ratio of equivalents of the N-heterocyclic compound to the polyepoxide respectively is from about 0.5:1.0 to about 1.5:1.0, preferably from about 0.9:1.0 to about 1.1:1.0, and most preferably 1.0 to 1.0; (B) from about 40 percent to about 8 percent by weight of a polyepoxide; and (C) the balance an organic solvent, providing the ratio of N-heterocyclic moieties in the reaction product to epoxy groups in the composition is equal to or greater than 0.6, preferably equal to or greater than 0.8. Generally, the percent by weight of solids in the composition does not exceed about 70 percent, and typically does not exceed about 60 percent. However, the percent by weight of solids in the composition may be higher than 70 percent provided it is not so high as to render the composition so unstable as to be effectively unuseable as a coating composition.

Preferred coating compositions contain from about 15 to about 40 percent by weight of a resin of the invention, from about 10 to about 25 percent by weight of the polyepoxide (component B), and the balance an organic solvent.

The polyepoxide which may be used as component B of the coating composition of the invention can be any of the previously described polyepoxides used in the reaction with the N-heterocyclic compounds to form the resins of the invention. Preferred polyepoxides are the polyglycidyl ethers of polyphenols, particularly polyglycidyl ethers of bisphenol A. The polyepoxides used for component B of the invention may be monomeric or polymeric.

It is to be understood that polyepoxide of Component B of a coating composition of the invention includes any unreacted polyepoxide which may be in admixture with resin of the invention prepared as discussed previously using an excess of equivalents of polyepoxide over equivalents of N-heterocyclic compound.

Preferred resins of component A of the compositions are the previously described reaction products of amino or mercapto substituted triazoles with either the aforementioned polyglycidyl ethers of polyphenols or the aforementioned acrylic resins containing epoxy groups.

The coating compositions of the invention provide the distinct advantages of being one package systems which are storage stable over extended periods of time. These compositions are storage stable generally for at least 2 weeks at 50° C., typically for at least 4 weeks at 50° C. and depending on the various composition formulations within the limits of the present invention can be storage stable at 50° C. for even substantially longer periods.

The coating compositions also contain an organic solvent. Generally, the amount of organic solvent ranges up to about 30 percent, typically up to about 40 percent, and usually up to about 45 percent by weight of the total composition. However, smaller amounts than 30 percent by weight of solvent may be used provided that the percent by weight of solids in the composition does not become so high as to render the composition so unstable as to be effectively unusable as a coating composition. Examples of suitable organic solvents include any of the organic solvents previously mentioned which are used to control the reaction between the N-heterocyclic compound and the polyepoxide to form the resin and may also include any other suitable organic solvent.

The coating compositions of the invention described above are substantially clear compositions. However, various pigments and other additives such as flow control agents, flatting agents, surfactants, etc. may be included in the compositions of the invention. Pigments may be easily incorporated into the compositions of the invention. Suitable pigments include, for example, any of the generally known pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, etc. The pigments are generally pulverized solids. Mixtures of pigments may also be employed. Of course, if pigments or various additives are used in the coating compositions of the invention, the total percent by weight of solids in the composition should not be so high as to render the composition so unstable as to be effectively unuseable as a coating composition as discussed previously.

In one embodiment of the invention additional cross-linking agents are incorporated in the coating compositions of the invention. Such cross-linking agents include, for example, aminoplast resins, phenoplast resins and blocked or semi-blocked polyisocyanates.

Aminoplast resins refer to the generally known condensation products of an aldehyde with an amino- or amido-group containing substance. Examples of suitable aminoplast resins for incorporation in the coating compositions include the reaction products of formaldehyde, acetaldehyde, crotonaldehyde, benzaldehyde and mixtures thereof with urea melamine and benzo-guanamine. Etherified products obtained from the reaction of alcohols and formaldehyde with melamine, urea or benzoguanamine are preferred aminoplast resins for use in aqueous based coating compositions because of their good water dispersibility. Examples of suitable alcohols for making these etherified products include: methanol, ethanol, propanol, butanol, hexanol, benzylalcohol, cyclohexanol, 3-chloropropanol and ethoxyethanol. Preferred aminoplast resins are etherified melamine-formaldehyde resins. Additional examples of suitable aminoplast resins are described in U.S. Pat. No. 4,075,141 which is hereby incorporated by reference.

Phenoplast resins as used herein refer to the generally known condensation products of an aldehyde with a phenol. Suitable aldehydes include, for example, those previously described with reference to aminoplast resins. Preferred aldehydes are formaldehyde and acetaldehyde. Examples of suitable phenols for making the phenoplast resins include for example, phenol per se, cresol, p-phenylphenol, p-tert-butylphenol, p-tert-amylphenol, and cyclopentylphenol. Examples of additional phenoplast resins which may be incorporated in the compositions of the invention are described in U.S. Pat. No. 4,075,141 hereby incorporated by reference.

Blocked and/or semi-blocked polyisocyanates may be used as additional crosslinking agents. Blocked or semi-blocked isocyanates are well known. The blocked and/or semi-blocked isocyanates which may be used herein include any polyisocyanate in which all or a portion of the isocyanate groups have been reacted with a blocking agent. The unblocking temperatures of these blocked or semi-blocked isocyanates generally will vary of course depending on the curing temperatures of the compositions of the invention. In the preparation of the blocked or semi-blocked polyisocyanate, any suitable organic polyisocyanate may be used, examples of which include: trimethylene, tetramethylene, 1,2-propylene, 1,2-butylene and butylidene-diisocyanates; 1,3-cyclopentane, 1,4-cyclohexane, and 1,2-cyclohexane diisocyanates, m-phenylene and 1,4-naphthalene diisocyanates; 4,4'-diphenylmethane diisocyanate, 2,4- or 2,6-tolyene diisocyanates and mixtures thereof; and known organic polyisocyanate prepolymers derived from the reaction of a polyol such as a polyether or polyester polyol with excess polyisocyanate. The isocyanate blocking agents which may be used are well known in the art. Examples of suitable blocking agents include: butanol, phenol, ethanol, m-cresol, 2-methyl-2-propanol, benzenethiol and the like. Further description of many suitable blocked isocyanates can be found in *The Chemistry of Organic Film Formers*, by D. H. Solomon, John Wiley and Sons, 1967, pages 216–217 the disclosure of which is hereby incorporated by reference.

The additional cross-linking agents may be incorporated into the coating compositions by either introducing them into the azole compound/polyepoxide reaction mixture during the formation of the azole-functional epoxy-derived resin provided they do not cause gellation of the reaction mixture or preferably by introducing them into the coating composition mixture of azole-functional epoxy-derived resin, organic solvent, and polyepoxide (component B). These optional cross-linking agents generally are used in amounts of about 0 percent to about 40 percent by weight, preferably about 5 percent to about 20 percent by weight, based on the total solids in the composition.

The coating compositions may be applied to a wide variety of substrates using any suitable application technique such as brushing, spraying, roller coating, doctor blade coating, etc. Examples of suitable substrates include plastics, metal, composition board, and the like. The compositions of the invention provide a particularly desirable coating for metal substrates. The cured compositions provide coatings which are resistant to organic solvents such as acetone, have a high degree of hardness, are humidity resistance, and have a high degree of gloss.

A number of crosslinking reactions may be possible during curing of the compositions of the invention. An example of just one useful cross-linking mechanism may be thought to proceed merely by way of illustration as follows:

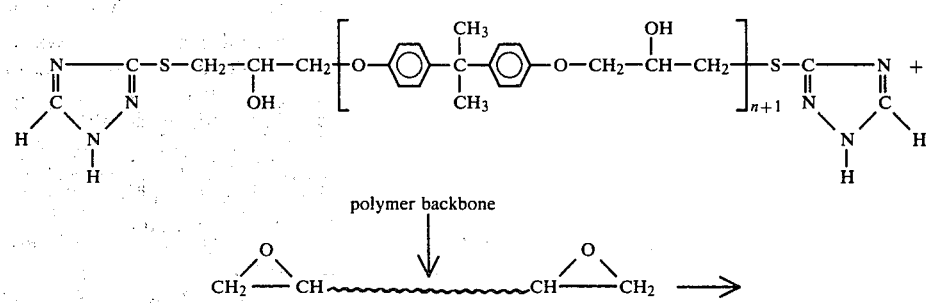

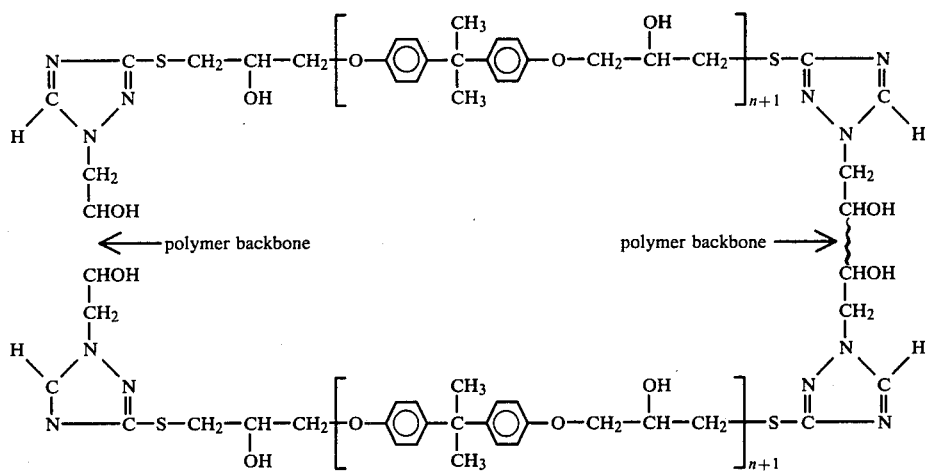

wherein n generally ranges from about 0 to about 25.

The coating compositions advantageously can be cured quickly at low temperatures. For example, the compositions may be cured in about 10 minutes at about 100° C. Generally, the compositions can be cured within 15 minutes at a temperature from about 90° C. to about 125° C., preferably within 10 minutes at a temperature from about 100° C. to about 121° C. Of course, the use of higher temperatures would require shorter curing periods. However, a distinct advantage of the compositions of the invention is the low temperatures which may be used to effect curing in relatively short time periods.

The invention is illustrated by the following examples. Quantities and percentages are by weight unless stated otherwise. Examples I through IV illustrate preparations of the mercapto- and amino-substituted, azole-functional, epoxy resins. Examples V through XVI illustrate the formulation of unpigmented coating compositions of the invention and the production of films from these compositions. Examples XVII through XIX illustrate the formulation of pigmented coating compositions and the production of films from these compositions. Example XIX also illustrates the formulation of a coating composition incorporating an additional cross-linking agent.

Whenever used herein, an equivalent weight of N-heterocyclic group containing resin is the calculated weight in grams which contains one mole of N-heterocyclic moieties. For example, if 125 grams of an epoxide functional resin having an epoxide equivalent weight of 500 (therefore 0.25 equivalents) were reacted with 25 grams (0.25 equivalents) of 3-mercapto-1,2,4-triazole which has a molecular weight of 101 and may be represented by the formula

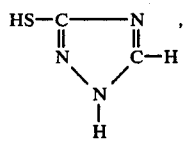

the calculated equivalent weight of the product would be 601 (i.e., 500+101). Thus an equivalent of such a N-heterocyclic group containing resin would correspond to 601 grams of the N-heterocyclic group containing resin.

EXAMPLE I

A 500 ml. reaction flask was charged with 42 grams (0.50 mole) of 3-amino-1,2,4-triazole and 34 grams of ethylene glycol monoethyl ether. The flask was equipped with stirrer, condenser, thermometer, addition funnel and heating mantle. The mixture was heated to 105° C. and 92.5 grams (0.25 mole) of a polyglycidyl ether of a polyphenol, having an average molecular weight of about 380 and Epoxy Equivalent Weight of about 190 available from Shell Chemical Co. as EPON 828, was added over a 30 minute time period. The addition caused the mixture to exotherm to 120° C. Then 38.6 grams of additional ethylene glycol monoethyl ether was added. The resultant product was a clear homogeneous liquid containing about 65% by weight solids. The calculated equivalent weight of the triazole-functional resin was about 274 grams per equivalent.

EXAMPLE II

A reaction flask was charged with 84.0 grams (1.00 mole) of 3-amino-1,2,4-triazole and 317.0 grams of ethylene glycol monoethyl ether. The flask was equipped with stirrer, condenser, thermometer, addition funnel and heating mantle. This mixture was heated to 90° C. and 505 grams (0.50 mole) of a polyglycidyl ether of a polyphenol, available from Shell Chem. Co. as EPON 1001 (average Molecular Weight of about 1000 and average Epoxy Equivalent Weight of about 500) was heated and added over a ½ hour period. The addition produced a slight exotherm. The resultant product was a clear homogeneous liquid containing about 65% by weight solids. The calculated equivalent weight of the triazole-functional resin was about 584 grams per equivalent.

EXAMPLE III

A 500 ml. reaction flask was charged with 50 grams (0.495 mole) of 3-mercapto-1,2,4-triazole and 125 ml. of ethylene glycol monoethyl ether. The flask was equipped with an addition funnel, stirrer, condenser, thermometer and heating mantle. The mixture was heated to 100° C. and 103.45 grams (0.27 mole) of the polyglycidyl ether of a polyphenol of EXAMPLE I (EPON 828) was added over 2 hours while the temperature was maintained between 90° and 100° C. The reaction mixture was stirred for an additional three hours to complete the reaction. The resultant product was a clear, pale yellow, homogeneous liquid containing about 56% by weight solids. The calculated equivalent weight of the triazole-functional resin was about 291 grams per equivalent.

EXAMPLE IV

A 500 ml. reaction flask was charged with 25 grams (0.248 mole) of 3-mercapto-1,2,4-triazole and 75 ml. of ethylene glycol monoethyl ether. The flask was equipped with an addition funnel, stirrer, condenser, thermometer and heating mantle. The mixture was heated to 100° C. and 240 grams (0.12 mole) of a 50 percent solids solution in ethylene glycol monoethyl ether of the polyglycidyl ether of a polyphenol of EXAMPLE II (EPON 1001) was added over 1½ hours. The temperature was maintained at 100° C. during the addition. The reaction mixture was stirred for an additional 3 hours until the reaction was complete. The resultant product was a clear, pale yellow, homogenous liquid containing about 46% by weight solids. The calculated equivalent weight of the triazole functional resin was about 601 grams per equivalent.

EXAMPLE V

A coating composition was formulated as follows:

|  | Parts by weight |
| --- | --- |
| Polyepoxide product of EXAMPLE I | 58.8 |
| EPON 828 | 19.2 |
| Ethylene glycol monoethyl ether | 22 |

A film was made by drawing down the composition on a metal panel and curing it at 95° C. for 10 minutes. The resultant film had a high gloss, withstood over 100 acetone double rubs, and had a 3H pencil hardness. Pencil hardness in this and all the following examples wherein used was determined by a method known in the art and described, for example, in *Paint Testing Manual*, H. A. Gardner and G. G. Sword (1962), pages 283-284. Additionally, acetone double rubs wherever used herein are generally understood to mean the number of back and forth finger rubs across the cured film with cheesecloth dipped in acetone. The number of acetone double rubs given for the cured films herein is the number that the film could withstand without any noticeable evidence of deterioration.

EXAMPLE VI

A coating composition formulated as follows:

|  | Parts by weight |
| --- | --- |
| Polyepoxide product of EXAMPLE I | 58.8 |
| EPON 828 | 19.2 |
| Ethylene glycol monoethyl ether | 22 |

A film was made by drawing down the composition on a metal panel and curing it at 121° C. for 5 minutes. The cured film withstood over 110 acetone double rubs and had a 4H pencil hardness.

EXAMPLE VII

A coating composition was formulated as follows:

|  | Parts by weight |
| --- | --- |
| Polyepoxide product of EXAMPLE I | 42 |
| EPON 828 | 6.0 |
| EPON 1001* | 34 |
| Ethylene glycol monoethyl ether | 18 |

*As a 50 percent by weight solids solution in ethylene glycol monoethyl ether.

(a) A film was made by drawing down the composition on a metal panel and curing it at 93° C. for 10 minutes. The resultant film withstood 60 acetone double rubs and had a HB pencil hardness.

(b) A film was prepared in the same manner as Example (a) immediately above except that it was baked at 121° C. for 10 minutes. The resultant film withstood over 100 acetone double rubs and had a 4H pencil hardness.

EXAMPLE VIII

A coating composition was formulated as follows:

|  | Parts by weight |
| --- | --- |
| Polyepoxide product of EXAMPLE I | 61.3 |
| EPON 828 | 14.6 |
| EPON 1001* | 24.1 |

*As a 50 percent by weight solids solution in ethylene glycol monoethyl ether.

A film was made by drawing down the composition on a metal panel and curing it at 121° C. for 10 minutes. The cured film withstood over 100 acetone double rubs and had a 4H pencil hardness.

EXAMPLE IX

A coating composition was formulated as follows:

|  | Parts by weight |
| --- | --- |
| Polyepoxide product of EXAMPLE II | 63 |
| EPON 828 | 9.0 |
| Ethylene glycol monoethyl ether | 28 |

A film was made by drawing down the composition on a metal panel and curing it at 121° C. for 10 minutes. The resultant film withstood 90 acetone double rubs and had a 4H pencil hardness.

EXAMPLE X

A coating composition was formulated as follows:

|  | Parts by weight |
| --- | --- |
| Polyepoxide product of EXAMPLE II | 65.5 |
| EPON 828 | 12.4 |
| Ethylene glycol monoethyl ether | 22.1 |

A film was made by drawing down the composition on a metal panel and baking it at 121° C. for 10 minutes. The resultant film withstood 160 acetone double rubs and had a 3H pencil hardness.

EXAMPLE XI

A coating composition was formulated as follows:

|  | Parts by weight |
| --- | --- |
| Polyepoxide product of EXAMPLE II | 42.2 |
| EPON 1001* | 46.9 |

| | Parts by weight |
|---|---|
| Ethylene glycol monoethyl ether | 10.9 |

*As a 50 percent by weight solids solution in ethylene glycol monoethyl ether.

A film was made by drawing down the composition on a metal panel and curing it at 121° C. for 10 minutes. The cured film withstood 45 acetone double rubs and had a 3H pencil hardness.

EXAMPLE XII

A coating composition was formulated as follows:

| | Parts by weight |
|---|---|
| Polyepoxide product of EXAMPLE I | 65.3 |
| EPON 812 | 22.3 |
| Ethyleneglycol monoethyl ether | 12.0 |
| Flow control agent* | 0.3 |

*A silicone flow control agent available from Dow Corning Corporation as DOW CORNING 14.

A film was made by drawing down the composition on a metal panel and curing it at 107° C. for 10 minutes. The cured film withstood over 150 acetone rubs and had a 4H pencil hardness.

EXAMPLE XIII

A coating composition was formulated as follows:

| | Parts by weight |
|---|---|
| Polyepoxide product of EXAMPLE I | 55.8 |
| EPON 812 | 31.9 |
| Ethylene glycol monoethyl ether | 9.8 |
| Flow control agent of EXAMPLE XII | 2.4 |

A film was made by drawing down the composition on a metal panel and curing it at 107° C. for 10 minutes. The resultant film withstood over 140 acetone double rubs, had a 6H pencil hardness, and withstood a 120 inch-pound direct impact as determined using a Gardener Impact Tester of a type similar to that described in *Paint Testing Manual* (1962), H. A. Gardener and G. G. Sword on page 147.

EXAMPLE XIV

A coating composition was formulated as follows:

| | Parts by weight |
|---|---|
| Polyepoxide product of EXAMPLE III | 72.0 |
| EPON 828 | 14.1 |
| Ethylene glycol monoethyl ether | 10.9 |
| Flow control agent of EXAMPLE XII | 2.8 |

A film was made by drawing down the composition on a metal panel and curing it at 93° C. for 10 minutes. The resultant film withstood 60 acetone double rubs and had a 3H pencil hardness.

EXAMPLE XV

A coating composition was formulated as follows:

| | Parts by weight |
|---|---|
| Polyepoxide product of EXAMPLE III | 59.1 |
| EPON 828 | 21.2 |
| Ethylene glycol monoethyl ether | 17.3 |
| Flow control agent of EXAMPLE XII | 2.4 |

A film was made by drawing down the composition on a metal panel and curing it at 93° C. for 10 minutes. The cured film withstood 90 acetone double rubs and had a 5H pencil hardness.

EXAMPLE XVI

A coating composition was formulated as follows:

| | Parts by weight |
|---|---|
| Polyepoxide product of EXAMPLE IV | 84.4 |
| EPON 828 | 11.8 |
| Flow control agent of EXAMPLE XII | 3.8 |

A film was made by drawing down the composition on a metal panel and curing it at 121° C. for 15 minutes. The cured film withstood 23 acetone double rubs and had a 5H pencil hardness.

EXAMPLE XVII

A coating composition was formulated as follows:

| | Parts by weight |
|---|---|
| Polyepoxide product of EXAMPLE I | 32.5 |
| EPON 828 | 7.0 |
| EPON 812 | 2.9 |
| EPON 1001* | 6.2 |
| Titanium dioxide | 10.3 |
| Aluminum silicate | 12.2 |
| Carbon (lampblack) | 0.5 |
| Ethylene glycol monoethyl ether | 6.4 |
| Diethylene glycol monobutyl ether | 20.7 |
| Flow control agent of EXAMPLE XII | 0.84 |
| Defoamer** | 0.5 |

*As a 50 percent by weight solids solution in ethylene glycol monoethyl ether.
**A silicone defoaming agent available from Dow Corning Corporation as DOW CORNING 7.

A film was made by spraying the coating composition onto a metal panel and curing the composition for 10 minutes at 107° C. The cured film had a thickness of 0.5 mils, a pencil hardness of 4H, and a 60° gloss of 80+. The film also withstood a direct impact of 60 inch-pounds.

EXAMPLE XVIII

A coating composition was formulated as follows:

| | Parts by weight |
|---|---|
| Polyepoxide product of EXAMPLE II | 28.8 |
| EPON 828 | 6.3 |
| EPON 1001* | 8.3 |
| Titanium dioxide | 8.9 |
| Aluminum silicate | 10.5 |
| Carbon (lampblack) | .04 |
| Ethylene glycol monoethyl ether | 16.1 |
| Diethylene glycol monobutyl ether | 19.7 |
| Flow control agent of EXAMPLE XII | 0.8 |
| Defoamer of EXAMPLE XVII | 0.6 |

*As a 50 percent by weight solids solution in ethylene glycol monoethyl ether.

The composition remained fluid and useable after 2½ months storage in a hot room at 48.9° C.

A film was made by spraying the coating composition onto a metal panel and curing the composition for 15 minutes at 121° C. The cured film had a thickness of from 0.6–0.7 mils, a pencil hardness of 3H, and a 20° gloss of 90+. The film also withstood 90 acetone double rubs and a 60 inch-pound direct impact.

EXAMPLE XIX

A coating composition was formulated as follows:

|  | Parts by weight |
|---|---|
| Polyepoxide product of EXAMPLE II | 24.6 |
| EPON 828 | 4.8 |
| CYMEL 370* | 10.8 |
| TiO$_2$ | 7.5 |
| Talc | 2.1 |
| Aluminum silicate | 11.4 |
| Carbon (lampblack) | 0.04 |
| Ethylene glycol monoethyl ether | 14.7 |
| Diethylene glycol monobutyl ether | 22.7 |
| Flow control agent of EXAMPLE XII | 0.5 |
| Defoamer of EXAMPLE XVII | 0.43 |
| p-toluene sulfonic acid | 0.16 |

*A methylated melamine resin available from American Cyanamid Company.

The composition remained fluid and useable after 2 weeks storage in a hot room at 48.9° C.

A film was made by dipping a metal panel into the coating composition and curing the composition for 15 minutes at 149° C. The cured film had a thickness of 0.48 mils, withstood 100 acetone double rubs, and withstood a direct impact of 60 inch-pounds.

What is claimed is:

1. A curable resin comprising: the reaction product of
   (A) a N-heterocyclic compound selected from the group consisting of a triazole, a tetrazole and a mixture thereof, said N-heterocyclic compound substituted on at least one carbon atom in the N-heterocyclic ring by a group of the formula

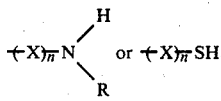

wherein
   X represents an alkylene group containing from 1 to 6 carbon atoms optionally halogen substituted, a cycloalkylene group containing from 5 to 8 carbon atoms optionally halogen substituted, or a phenylene group optionally substituted by halogen and/or an alkyl group containing from 1 to 6 carbon atoms,
   n represents 0 or 1, and
   R represents hydrogen, an alkyl group containing from 1 to 6 carbon atoms optionally halogen substituted, or a cycloalkyl group containing from 5 to 8 carbon atoms optionally halogen substituted; and
   (B) a polyepoxide wherein the ratio of equivalents of said N-heterocyclic compound to said polyepoxide is from about 0.5:1.0 to about 1.5:1.0.

2. The resin of claim 1 wherein said N-heterocyclic compound is a triazole.

3. The resin of claim 2 wherein said triazole is selected from the group consisting of 3-amino-1,2,4-triazole, 5-amino-1,2,4-triazole, 4-amino-1,2,3-triazole, 5-amino-1,2,3-triazole, 3-mercapto-1,2,4-triazole, 5-mercapto-1,2,4-triazole, 4-mercapto-1,2,3-triazole, 5-mercapto-1,2,3-triazole, and a mixture thereof.

4. The resin of claims 1, 2, or 3 wherein said polyepoxide is a polyglycidyl ether of a polyphenol.

5. The resin of claim 4 wherein said polyglycidyl ether is a polyglycidyl ether of 2,2-bis (4-hydroxyphenyl) propane.

6. The resin of claim 1 wherein said N-heterocyclic compound is substituted by said +X)$_{\overline{n}}$SH group and said resin is at least partially neutralized by a solubilizing organic or inorganic base.

7. The resin of claim 6 wherein said base is selected from the group consisting of ammonium hydroxide, an amine, potassium hydroxide, sodium hydroxide and a mixture thereof.

8. The resin of claim 1 wherein said N-heterocyclic compound is substituted by said group of the formula

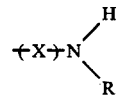

and said resin is at least partially neutralized by a solubilizing organic or inorganic acid.

9. The resin of claim 8 wherein said acid is selected from the group consisting of formic acid, acetic acid, lactic acid, phosphoric acid and a mixture thereof.

10. The resin of claim 1 wherein said polyepoxide is an acrylic resin containing epoxy groups.

11. The resin of claim 10 wherein said N-heterocyclic compound is a triazole.

12. The resin of claim 11 wherein said triazole is selected from the group consisting of 3-amino-1,2,4-triazole, 5-amino-1,2,4-triazole, 4-amino-1,2,3-triazole, 5-amino-1,2,3-triazole, 3-mercapto-1,2,4-triazole, 5-mercapto-1,2,4-triazole, 4-mercapto-1,2,3-triazole, 5-mercapto-1,2,3-triazole, and a mixture thereof.

13. The resin of claim 10 wherein said N-heterocyclic compound is substituted by said group of the formula +X)$_{\overline{n}}$SH and said resin is at least partially neutralized by a solubilizing organic or inorganic base.

14. The resin of claim 13 wherein said base is selected from the group consisting of ammonium hydroxide, an amine, potassium hydroxide, sodium hydroxide and a mixture thereof.

15. The resin of claim 10 wherein said N-heterocyclic compound is substituted by said group of the formula

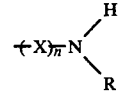

and said resin is at least partially neutralized by a solubilizing organic or inorganic acid.

16. The resin of claim 15 wherein said acid is selected from the group consisting of formic acid, acetic acid, lactic acid, phosphoric acid and a mixture thereof.

17. A curable composition comprising:
   (A) from about 15 percent to about 45 percent by weight of the reaction product of
      (i) a N-heterocyclic compound selected from the group consisting of a triazole, a tetrazole, and a mixture thereof, said N-heterocyclic compound substituted on at least one carbon atom in the N-heterocyclic ring by a group of the formula

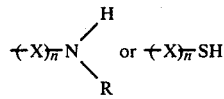

wherein
X represents an alkylene group containing from 1 to 6 carbon atoms optionally halogen substituted, a cycloalkylene group containing from 5 to 8 carbon atoms optionally halogen substituted, or a phenylene group optionally substituted by halogen and/or an alkyl group containing from 1 to 6 carbon atoms, n represents 0 or 1, and R represents hydrogen, an alkyl group containing from 1 to 6 carbon atoms optionally halogen substituted, or a cycloalkyl group containing from 5 to 8 carbon atoms optionally halogen substituted, and (ii) a polyepoxide wherein the ratio of equivalents of said N-heterocyclic compound to said polyepoxide is from about 0.5:1.0 to about 1.5:1.0;

(B) from about 40 percent to about 8 percent by weight of a polyepoxide; and (C) the balance an organic solvent, providing that the ratio of N-heterocyclic moieties in said reaction product to epoxy groups in said composition is equal to or greater than 0.6.

18. The curable composition of claim 17 wherein said N-hetercyclic compound is a triazole.

19. The curable composition of claim 18 wherein said triazole is selected from the group consisting of 3-amino-1,2,4-triazole, 5-amino-1,2,4-triazole, 4-amino-1,2,3-triazole, 5-amino-1,2,3-triazole, 3-mercapto-1,2,4-triazole, 5-mercapto-1,2,4-triazole, 4-mercapto-1,2,3-triazole, 5-mercapto-1,2,3-triazole, and a mixture thereof.

20. The curable composition of claims 17, 18 and 19 wherein said polyepoxide of component (A)(ii) and said polyepoxide of component (B) are each a polyglycidyl ether of a polyphenol.

21. The curable composition of claim 17 wherein said polyglycidyl ether is a polyglycidyl ether of 2,2-bis (4-hydroxyphenyl) propane.

22. The curable composition of claim 17 further comprising a compound copolymerizable with said reaction product of component (A).

23. The curable composition of claim 22 wherein said copolymerizable compound is an aminoplast, a phenoplast or a mixture thereof.

24. The curable composition of claim 17 wherein said polyepoxide of component (A)(ii) is an acrylic resin containing epoxy groups.

25. The curable composition of claim 24 wherein said N-heterocyclic compound is a triazole.

26. The curable composition of claim 25 wherein said triazole is selected from the group consisting of 3-amino-1,2,4-triazole, 5-amino-1,2,4-triazole, 4-amino-1,2,3-triazole, 5-amino-1,2,3,-triazole, 3-mercapto-1,2,4-triazole, 5-mercapto-1,2,4-triazole, 4-mercapto-1,2,3-triazole, 5-mercapto-1,2,3-triazole, and a mixture thereof.

27. A method of coating a substrate comprising:

(A) applying to said substrate a composition comprising (i) from about 15 percent to about 45 percent by weight of the reaction product of a N-heterocyclic compound selected from the group consisting of a triazole, a tetrazole and a mixture thereof, said N-heterocyclic compound substituted on at least one carbon atom in the N-heterocyclic ring by a group of the formula

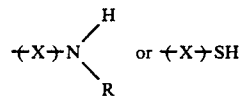

wherein
X represents an alkylene group containing from 1 to 6 carbon atoms optionally halogen substituted, a cycloalkylene group containing from 5 to 8 carbon atoms optionally halogen substituted, or a phenylene group optionally substituted by halogen and/or an alkyl group containing from 1 to 6 carbon atoms, n represents 0 or 1, and R represents hydrogen, an alkyl group containing from 1 to 6 carbon atoms optionally halogen substituted, or a cycloalkyl group containing from 5 to 8 carbon atoms optionally halogen substituted; and a polyepoxide wherein the ratio of equivalents of said N-heterocyclic compound to said polyepoxide is from about 0.5:1.0 to about 1.5:1.0.

(ii) from about 40 percent to about 8 percent by weight of a polyepoxide, and (iii) the balance an organic solvent, provided the ratio of N-heterocyclic moieties in said reaction product to epoxy groups in said composition is equal to or greater than 0.6; and (B) curing said composition.

28. The method of claim 27 wherein said N-heterocyclic compound is a triazole selected from the group consisting of 3-amino-1,2,4-triazole, 5-amino-1,2,4-triazole, 4-amino-1,2,3-triazole, 5-amino-1,2,3-triazole, 3-mercapto-1,2,4-triazole, 5-mercapto-1,2,4-triazole, 4-mercapto-1,2,3-triazole, 5-mercapto-1,2,3-triazole, and a mixture thereof.

29. The method of claim 28 wherein said polyepoxide of component (A)(i) is a polyglycidyl ether of a polyphenol.

30. The method of claim 29 wherein said polyglycidyl ether is a polyglycidyl ether of 2,2-bis-(4-hydroxyphenyl) propane.

31. The method of claims 27, 28, 29 or 30 wherein said composition is cured at a temperature of about 90° C. or higher.

* * * * *

UNITED STATES PATENT AND TRADEMARK OFFICE
CERTIFICATE OF CORRECTION

PATENT NO. : 4,322,459

DATED : March 30, 1982

INVENTOR(S) : Nicholas T. Castellucci, Johns S. Ostrowski and John F. Grunewalder It is certified that error appears in the above-identified patent and that said Letters Patent are hereby corrected as shown below:

In Claim 20, line 38, "claims 17, 18 and 19" should read --claims 17, 18 or 19--.

*Signed and Sealed this*

*Twenty-ninth* Day of *June 1982*

[SEAL]

Attest:

GERALD J. MOSSINGHOFF

*Attesting Officer*     *Commissioner of Patents and Trademarks*